Nov. 22, 1960   F. HENTSCHEL   2,961,485
REMOTE INDICATOR SYSTEM
Filed June 18, 1956   3 Sheets-Sheet 1

Inventor:
Friedrich Hentschel

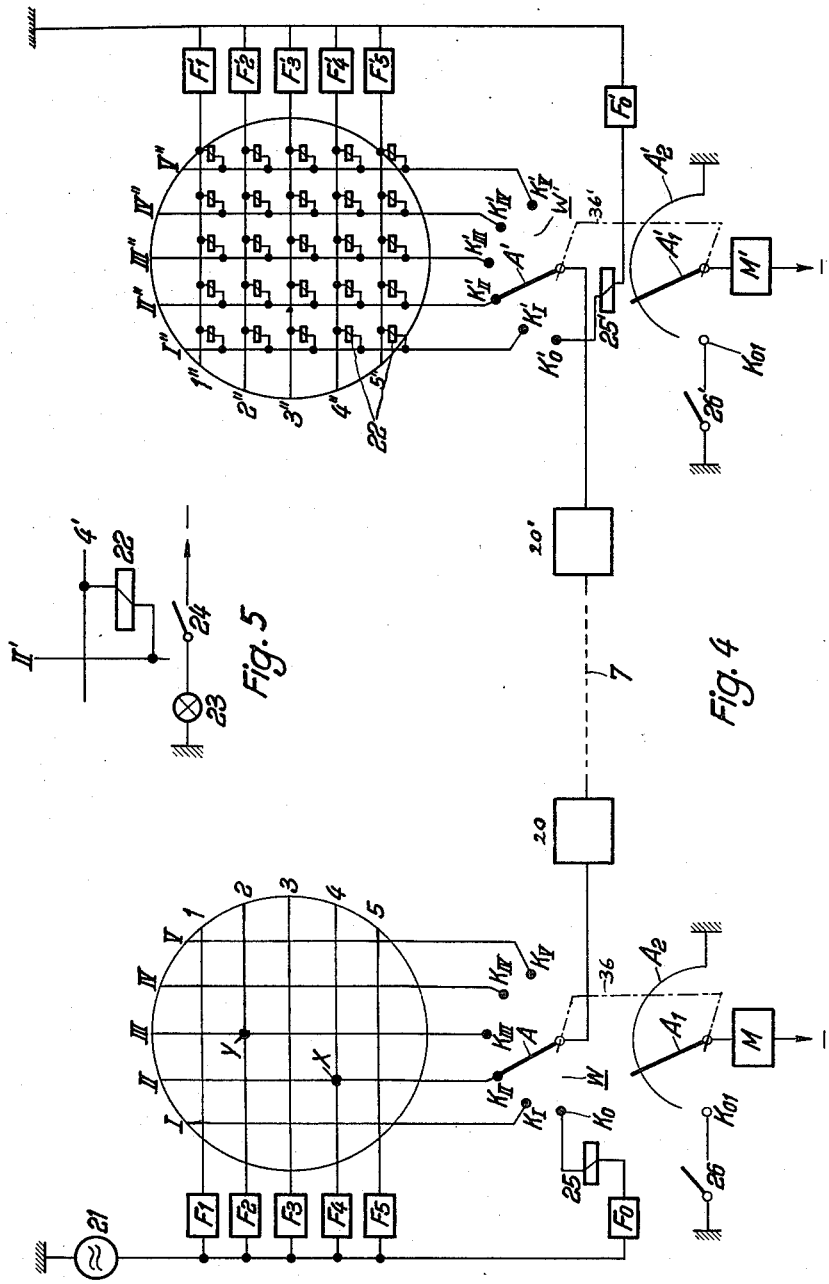

United States Patent Office 2,961,485
Patented Nov. 22, 1960

2,961,485

REMOTE INDICATOR SYSTEM

Friedrich Hentschel, Bonn, Germany, assignor to Telefunken G.m.b.H., Berlin, Germany Filed June 18, 1956, Ser. No. 592,085

16 Claims. (Cl. 178—6)

This invention relates to a method and apparatus for telegraphic or radio transmission of representations appearing on the screen of measuring or radar instruments.

The design and operation of radar or like apparatus, particularly, the type employing panoramic indication units, are well known. Such apparatus contains as indicating means a cathode ray tube, the screen of which is illuminated at such places as correspond with the position in space of the object reflecting the radio frequency waves transmitted by the transmitter of the radar apparatus. Thus, a plan-position picture is obtained on the screen, on which the reflecting objects are indicated as luminescent spots. If such radar apparatus is used to supervise the airspace, for example, in the neighborhood of an airport, it is mainly objects in the air which will be of interest.

If the supervision is to be carried out at a centrally located station, particularly, in a control tower, while the radar apparatus can be more suitably located at a distant station, a remote indicator unit is necessary.

It has been known to electrically transmit the pictures from the screen of such radar apparatus to the remote indicator. Usually, the voltages necessary for the deflection and the intensity control of the electron beam of the primary indicator are transmitted from the receiver of the radar apparatus to the remote indicator. Such transmission requires a wide frequency pass-band and, therefore, the use of valuable transmission channels, such as high frequency cables or directional radio-link channels. Methods have been known, permitting reduction in the transmission band width by using transmission pulses of lower frequency sequence, see "Electronics" of April 1952, pages 132 to 135, and of September 1952, pages 142 to 146. Such frequency band width still exceeds the transmission capacity of ordinary telephone lines and, in addition to this, is made expensive by relatively complicated converting devices. A further disadvantage of pulse transmission is the tendency to develop spurious noises.

According to another known method, an intermediate film is used for the remote picture transmission, whereby a picture of the indicator screen is taken every ten seconds. This film is then developed and projected on a remote screen. However, such method is not per se a remote teletransmission and is uneconomical.

According to a still other known method, a storing electron ray tube of special design, for example, a Graphechon tube, is used for the reproduction of the indication picture. A wide frequency band is still required for the transmission of the picture signals, so that the problem which is the basis of the present invention, i.e., the transmission of the primary picture within a narrow frequency range, has not been solved thereby.

It is an object of the present invention to electrically transmit the primary picture from the screen of radio measuring apparatus, particularly, of radar apparatus serving to supervise the airspace, so that for each luminescent mark or spot to be reproduced at a remote indicator, electrical magnitudes, representing the coordinates of the luminescent mark or spot on the screen, are transmitted from a transmitter to a receiver and are used to produce visual indications at corresponding points on the remote screen. These electrical magnitudes, for example, audio frequency oscillations transmitted in the form of pulses, can be selected in such a manner that they can be transmitted via intelligence channels adapted for telephone operation or radio program transmission. These intelligence channels may consist of wired systems, radio channels or carrier currents. The present novel method can be carried out in a very simple manner by providing crossed-grid units in both the transmitter and receiver.

So-called grids or lattices have been known for a long time in the television art (see "Handbuch der Bildtelegraphie und des Fernsehens" (Handbook for Picture Telegraphy and Television) by F. Schröter, pages 53 to 63), said grids or lattices comprising at the transmitter a mosaic of photoelectric cells and, at the receiver, an analogous mosaic of electric lights. Each photoelectric element of the transmitter is either permanently or periodically at a certain sequence connected with the corresponding light element of the remote screen and, thereby, controls the brightness of the remote screen in accordance with the brightness seen by the element in the transmitter. Various designs for such cells have been suggested and have been constructed in some cases. However, these grids have not been generally introduced for television purposes, because they require a relatively high expenditure, even in case of transmission of pictures of modest quality.

The conditions for the transmission of screen pictures of radar apparatus are different from those required in case of television pictures. While a television picture is made up of many thousands of tiny picture elements adapted to convey the impression of a composite picture and requires the reproduction of half-tones, the screen picture of a radar apparatus for air space supervision requires the transmission of only a few picture elements, because the number of aircraft in flight and the number of other targets to be considered, such as mountains or buildings, is limited. Half-tones and sharp contours of these picture points are unimportant. Furthermore, the transmission sequence can be considerably lower than in television.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figure 4 is a circuit diagram of another embodiment of the invention, showing both the transmitter and the receiver for the screen picture;

Figure 5 illustrates a portion of the circuit of the receiver shown on the right side of Figure 4;

Figure 1:
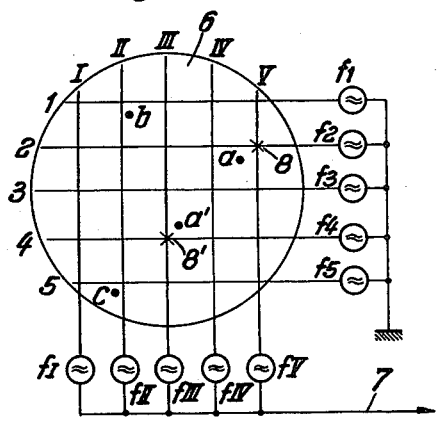
Figure 1 shows schematically a plan view of a primary screen of a radar or the like indicator apparatus with the basic circuit means according to the invention to transmit the picture on this screen to a remote location.

On the indicator screen of Figure 1, a few luminescent spots are denoted by $a$, $b$, $c$. A grid or lattice of two groups of conductors is provided above this screen, the conductors of the one group crossing the conductors of the other group at right angles. In order to simplify the figure, only five horizontal conductors 1, 2, 3, 4 and 5, and five vertical conductors I, II, III, IV, V, are indicated. All of these conductors are electrically insulated with respect to one another. The horizontal conductors are grounded via audio frequency generators $f_1 \ldots f_5$, while the vertical conductors are connected to a transmission line 7 via audio frequency generators $f_I \ldots f_V$. The frequencies of the audio frequency generators are different from one another by such amounts that they can be readily separated by means of electrical or mechanical filters. In the circuit of Figure 1, the transmisssion line ordinarily does not carry current. However, if two crossing conductors are electrically connected at their crossing point by means of a conductive bridge, such as a short-circuit plug or pin, a current path is established through which the alternating currents produced by the audio frequency generators can flow via the line 7, said current being connected to the interconnected conductors.

In place of the ground, another conductor may be used for the return line.

It will be readily seen that the conductors represent a rectangular coordinate system and that two audio frequencies are assigned to each crossing point. If these frequencies are transmitted via the line 7, due to the presence of an electric connection at such crossing point, it will be recognizable from the frequency content at the receiver end of the transmission line at which crossing point at the transmitter and the electric connection was established. In order to reproduce the position of the luminescent spot $a$, it is merely necessary to short-circuit the conductors 2 and V at an intersection 8 which is located closest to the luminescent point. As a result of this, the oscillations produced by the generators $f_2$ and $f_V$ are transmitted via the line 7. If the luminescent spot travels as a result of the movement of the target from $a$ to $a'$, the short-circuit is removed from the point 8 by the operator and the connection between the conductors is established at the location 8', i.e., the crossing point of the conductors 4 and III. In this case, the audio frequency oscillations of the generators $f_4$ and $f_{III}$ are flowing through the line 7. If several luminescent spots are to be transmitted, a plurality of electric connections must be established at corresponding crossing points. The transmission for all of these luminescent spots is carried out simultaneously and continuously. Luminescent spots caused by stationary reflectors, for example, towers, high buildings, and chimneys, need not be transmitted, because they can be applied permanently to the remote screen. Depending upon the required accuracy of the position of the luminescent spots at the receiver, the number of parallel conductors may amount to 50, 100 or 200, etc.

Figure 2:
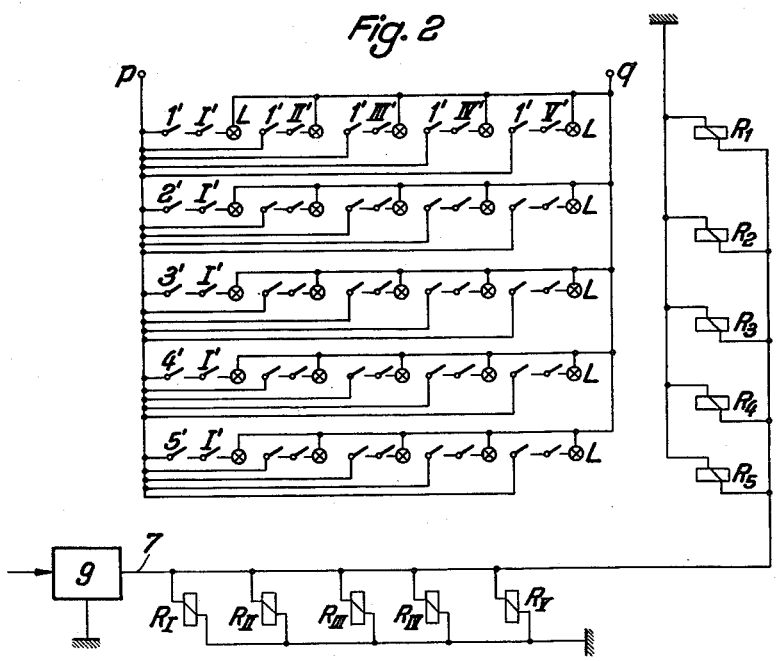
Figure 2 illustrates a circuit diagram at the remotely located receiver, where the picture of the primary screen, shown in Figure 1, is to be reproduced on a remote screen.

The indicating device in the receiver may comprise a lamp panel, as schematically shown in Figure 2. This panel comprises incandescent or glow lamps L, which are arranged in rows corresponding in number and arrangement with the crossing points in the grid at the transmitter. It is also possible to have a lamp panel of a much larger size which can be placed on a wall where it will be visible from a greater distance. If the space available is small, lamps of small dimensions, such as flashlights, endoscopy lamps, etc., may be employed.

Resonant relays $R_1 \ldots R_5$ and $R_I \ldots R_V$ are connected to the line 7 in which an amplifier 8 is inserted, each of said resonant relays being tuned to the frequency of one oscillation produced by the audio frequency generators of the transmitter. To each of said resonant relays, there are assigned as many operating contacts as there are lamps in the horizontal or vertical rows. The operating contacts belonging to the resonant relay $R_1$ are denoted by 1', while the operating contacts belonging to the resonant relay $R_I$ are denoted by I', etc. Each of the lamps L is connected in series with two operating contacts belonging to different resonant relays and to a current source suited to the lamp voltage, the terminals of this current source being denoted by $p$ and $q$. Thus, a lamp lights up only if two of the operating contacts connected in series with the lamp are simultaneously closed. For example, such condition exists for the lamp at the left upper corner when the resonant relays $R_1$ and $R_I$ are simultaneously energized, i.e., when according to Figure 1, the conductors 1 and I are short-circuited at their point of crossing. Thus, only those lamps light up which have positions on the lamp board corresponding to the short-circuited points of intersection of the conductor grid at the transmitter.

Electric filters may be provided in place of the resonant relays, each of said filters being adapted to pass only one audio frequency voltage to a rectifier, for instance, a small dry rectifier feeding the coil of a direct current relay, the working contacts of which carry out the same switching operations as the resonant relays mentioned in the foregoing.

If the number of necessary working contacts of a single relay should be too large, several relays may be shunted. It is also possible to use electronic relays in place of magnetic relays.

Figure 3:
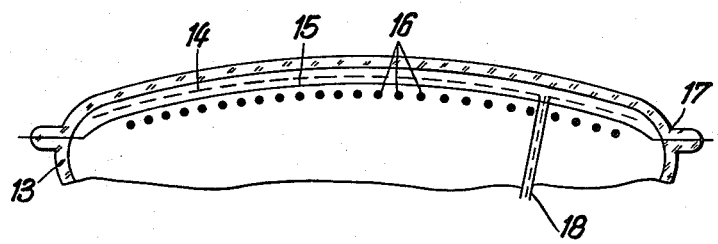
Figure 3 is a cross section through the front part of a cathode ray tube designed for use as an indicator in the transmitter according to this invention.

The grid or lattice at the transmitter, serving to initiate the signals, may be housed in a cathode ray tube, whereby an electron beam establishes the required crossing point conduction. A cross section through a part of a suitable cathode ray tube of this kind is shown in Figure 3. In this tube, the inside of the front of the tube envelope 13 is provided with a luminescent screen 14. The latter may be omitted if the tube is used only as an electron beam switch. However, such screen is useful for monitoring purposes. Two separate groups of parallel wires 15 and 16, arranged mutually perpendicular to one another, are provided across the cathode side of the screen, the arrangement of these wires corresponding to that of the conductors 1 . . . 5 and I . . . V in Figure 1. These wires are insulated with respect to one another and with respect to the luminescent screen and are individually passed to the outside through the vacuum envelope 13 of the tube by means of an annular flange 17. When an electron beam 18, scanning the screen and the wire grid or lattice, simultaneously strikes an upper and a lower wire, an electric connection between these wires is established, such connection having at the instant of contact the same action as a short-circuit at a point of crossing in the apparatus of Figure 1. Since a beam current will flow only if a luminescent spot is to be produced on the screen, the possibility of an electric connection exists only at the points of crossing lying in the path of the cathode beam. The transmission of the individual luminescent spots in this apparatus is carried out consecutively in periodic sequence and only during a short time interval. If it is desired to cause the lamps at the receiver to light up for a longer interval of time than that corresponding to the transmission time of a luminescent spot, thyratron triode gas-filled lamps may be used. This causes the lamps to light up until the anode voltage is switched off briefly by a periodically operating current interrupter.

A further transmitter system, known per se, for television purposes comprises a lattice or grid of small photoelectric cells, photoresistances or phototransistors, acting as switches and establishing electric connections between the grid conductors crossing one another at the points in question, when such cells are exposed to the light of luminescent spots, in the same way as by directly short-circuiting the grid conductors in Figure 1 crossing one another.

It is also possible to subdivide the image field into surface elements according to a polar coordinate system. In this case, the conductors 1 . . . 5 of Figure 1 will be designed in the form of concentric circles, while the conductors I . . . V are radii, or vice versa. This arrangement may be provided in the systems according to Figures 2 and 3.

The number of the audio frequencies necessary for the indication of the coordinate values may be decreased to half, if only the conductors of one group are each indicated by a separate audio frequency, while the conductors of the other group are successively connected to a common transmission line by means of two rotating selectors, one at the transmitter and one at the receiver, rotating synchronously. Such system is schematically illustrated in the circuit diagram of Figure 4. In the transmitter shown on the left side of this figure, conductors 1 . . . 5 and I . . . V crossing one another are adapted to be electrically connected at their crossing points either by mechanical or electronical contacts. A generator 21 produces a plurality of audio frequency voltages. One of these audio frequency voltages is fed to each of the conductors 1 . . . 5 by means of electric filters $F_1$ . . . $F_5$. The conductors I . . . V are connected to contacts $K_I$ . . . $K_V$ of a rotating selector W having a wiper arm A. If it is assumed that the wiper arm A rotates at a uniform speed and that conductivity is established at the crossing points $x$ and $y$ to indicate luminescent spots at these points, no signal will be transmitted via the transmission line 7 connected to the rotating shaft 36 of the wiper arm A when this wiper arm A engages the contact $K_1$, $K_4$ and $K_5$. However, the audio frequency passed by the filter $F_4$ during the engagement of the contact $K_{II}$ and the audio frequency passed by the filter $F_2$ during the engagement of the contact $K_{III}$ is fed to the transmission line 7.

The receiver shown on the right side of Figure 4 comprises a lamp board of the kind shown in Figure 2, having conductors 1'' . . . 5'' and I'' . . . V'', crossing one another. The audio frequency voltages received via the transmission line 7 and amplified in a transmitter amplifier 20 and a receiver amplifier 20', are individually fed to the conductors 1'' . . . 5'' via the filters $F_1'$ . . . $F_5'$. The conductors I'' . . . V'' are connected to the contacts $K_I'$ . . . $K_V'$ of the rotating selector W', designed in the same manner as the selector W at the transmitter. The conductors at the points of intersection are connected with one another by means of time delay relays 22, whereby the lamp circuits are arranged as shown in Figure 5. The time delay relays close quickly when energized, for example, within one millisecond, but they open slowly. A holding time of several seconds may be obtained and predetermined by a condenser shunted across the relay coil. The working contact 24 of the relay closes the circuit of an associated lamp 23 which is connected to a current source of suitable voltage. The motor speeds of the rotating selectors W and W' may be made equal, for example, by providing as their drive means synchronous motors fed from the same alternating current source or power line. If the relays are designed as direct current relays, the audio frequency voltage passed by the filters $F_1'$ . . . $F_5'$ may be rectified prior to its being fed to the relay coils, as has been mentioned in the foregoing with reference to Figure 2. In the position shown in Figure 4, the audio frequency current from the transmission line 7 flows via the wiper arm A' to the contact $K_{II}'$ and to the conductor II''. The current finds a path to ground via the relay coil provided to the point $x$, the conductor 4'' and the filter $F_4'$; while current flow via the bars 1'', 2'', 3'' and 5'' is blocked, because the filters connected to these bars cannot pass this audio frequency. As a result of this, the lamp at the point $x$ lights up and remains lighted until the armature of the time delay relay is attracted. The holding time of this relay is somewhat shorter than the time for returning the wiper arm A' to the contact $K_{II}'$.

For practical purposes, it is sufficient to use start-stop operations for the selectors W and W'. Consequently, stop contacts $K_0$ and $K_0'$ are provided, whereby the wiper arm is stopped after completion of one revolution at the stop contact. For this purpose and for initiating the subsequent rotation, the following additional apparatus is provided.

The generator 21 produces an additional audio frequency voltage which is supplied to the stop contact $K_0$ via a filter $F_0$ passed by said audio frequency and via the coil of a relay 25. An auxiliary wiper arm $A_1$ is mounted on the same shaft 36 as the wiper arm A, a contact segment $A_2$ and a stop contact $K_{01}$ being associated or cooperating with said auxiliary wiper arm $A_1$. Likewise, an auxiliary wiper arm $A_1'$ is mounted on the same shaft 36' as the wiper arm A'. The wiper arm $A_1$ is connected to the minus terminal of a voltage source via the drive motor M, the plus terminal of said voltage source being grounded. The contact segment $A_2$ is directly grounded, while the stop contact $K_{01}$ is grounded via the working contact 26 of the relay 25. The contact segment $A_2$ extends through the same arcuate angle around which the contacts $K_I$ . . . $K_V$ are arranged. The same kind of arrangement is provided at the receiver.

The selector motors M and M' are running so long as the wiper arm $A_1$ and $A_1'$ are riding on the contact segments $A_2$ or $A_2'$, respectively, but are stopped due to interruption of the current when the wiper arms $A_1$ and $A_1'$ engage the stop contacts $K_{01}$ or $K_{01}'$, respectively, and the working contacts 26 and 26' of the relays 25 or 25' are opened. These working contacts are closed only if the relay coils are energized and this takes place only if the wiper arm A engages the stop contact $K_0$ at the same time as the wiper arm A' engages the stop contact $K_0'$. Thus, the two rotary selectors can start further rotation only when both wiper arms have reached their stop contacts. Due to the same construction of the two rotary selectors, no disturbing differences in the speed will occur during one rotation.

If rotary selectors are used which carry out 100 switch steps in one second and if 200 conductors are provided in place of the five conductors I . . . V, as illustrated in Figure 4, the scanning time for the whole field of vision amounts only to two seconds and the contact time for each contact $K_I$ . . . $K_V$ to about 10 milliseconds. If desired, a longer contact time can be obtained, for example, by providing two rotary selectors on each side and two transmission lines, whereby the first rotary selector operates the conductors of even numbers, while the second selector operates the conductors of odd numbers. The operational capacity of the apparatus of Figure 4 will be recognized from the following consideration.

A grid or lattice comprising 200 x 200 conductors has 40,000 surface subdivisions, the transmission of which requires two seconds. In case of a radar apparatus of a range of 100 km., an indicating accuracy of one kilometer is obtained which is sufficient in practice, because the length of one kilometer is passed by an airplane in about 10 seconds at a normal flying speed.

A further design for an indicating apparatus at the receiver according to this invention will be briefly explained in the following.

Figure 6:
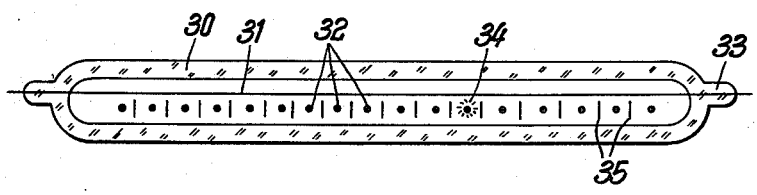
Figure 6 is a cross section through a modified cathode ray tube to be used as an indicator in the receiver according to the present invention.

Figure 6 is a section through a disc-like vacuum envelope 30 of glass filled with a rare gas, which may be ionized, at such pressure that a glow discharge can be maintained therein. Two groups of parallel wires 31 and 32 crossing one another are secured in the vacuum chamber, said wires being passed individually through the vessel to the outside by means of a flange 33. If a voltage sufficient for lighting and maintaining a luminescent glow discharge is applied across a wire of the upper group and a wire of the lower group, a glow discharge 34 is obtained at the point where these two wires are closest together, said glow discharge being extinguished as soon as the voltage is removed. A limiting of the discharge to the neighborhood of the respective point of crossing can be obtained by means of segregating partitions 35. The wires are to be connected in the same way as the conductors 1″ . . . 5″ and I″ . . . V″ in Figure 4.

I claim:

1. Electrical apparatus for providing on a remotely located screen an approximation of the indications appearing on a primary screen as discrete spots of light, comprising a grid having two groups of crossed conductors forming a system of crossed coordinates coextensive with said primary screen, the conductors all being mutually out of contact; a remote grid comprising said remotely located screen and having a system of crossed conductors similar to those of said grid at the primary screen; selection means for identifying the respective conductors of the groups at the grids respectively located at the primary screen and forming the remotely located screen and including audio frequency generation means connected with the conductors of at least one group of said primary grid and imposing thereon different frequencies each uniquely identifying a conductor; short-circuiting means for electrically bridging the gap between at least one pair of crossing conductors adjacent to each light spot; connecting means connecting the conductors of the grids located at the primary screen with the conductors at the remotely located screen, said connecting means carrying currents corresponding to frequencies imposed on conductors which cross and are mutually short-circuited at the primary-screen grid, said currents identifying the coordinates of illuminated crossing points; audio frequency resonant selectors connected between each of the conductors of said audio-frequency-identified group at the remotely located screen and said connecting means, lamp means located at each conductor crossing point on the remotely located screen, and said resonant selectors passing currents of selected frequencies to illuminate those of said lamp means which are at the crossing points of conductors connected with resonant selectors which are conducting currents.

2. Apparatus according to claim 1, wherein said conductors are arranged to form a grid based on a rectangular coordinate system.

3. Apparatus according to claim 1, wherein said conductors are arranged to form a grid based on a polar coordinate system.

4. Apparatus according to claim 1, wherein the primary screen is the face of a cathode ray tube and the conductor grid is located within the tube and behind the screen, the beam of the tube constituting said short-circuiting means.

5. Apparatus as set forth in claim 1, wherein a source of electric power is provided to light said lamp means and said lamp means includes a relay across the conductors at each crossing point to actuate said source.

6. Apparatus according to claim 1, wherein said remotely located screen and coextensive grid comprise a transparent vessel containing the grid and filled with a rare gas capable of ionization, said grid conductors of the two groups crossing close to each other so that when an audio frequency of sufficient intensity is applied, a gas-discharge glow will be set up in the vesesel in the vicinity of the crossing of two conductors.

7. In apparatus as set forth in claim 2, said audio frequency generating means being connected to only one group, and sequential switching means for connecting the conductors of the other group at the primary screen one by one to the conductors of the corresponding group at the remotely located screen, whereby a lamp of said lamp means will be lighted each time two crossing conductors are connected with corresponding short-circuited conductors at the primary screen through a resonant selector and the sequential switching means.

8. Apparatus according to claim 7, wherein said sequential switching means comprises two selector switches having motor-driven wiper arms mutually joined by a transmission line.

9. Apparatus according to claim 8, wherein said wiper arms are driven by two separate motors of similar characteristics, and switch means whereby the rotation of the motors is briefly interrupted at the end of each revolution unless the motors are in phase with respect to their starting angles.

10. Apparatus according to claim 7, wherein a single generator creates all of the audio frequencies employed, and said frequencies are individually distributed to the conductors of said one group at the primary screen through individual resonant filters.

11. Apparatus as set forth in claim 7, wherein a source of electric power is provided to light said lamp means and said lamp means includes a relay across the conductors at each crossing point to actuate said source.

12. Apparatus according to claim 7, wherein said conductors are arranged to form a grid based on a rectangular coordinate system.

13. Apparatus according to claim 7, wherein said conductors are arranged to form a grid based on a polar coordinate system.

14. Apparatus according to claim 7, wherein the conductor grid at the primary screen overlies the outer viewing surface of the screen.

15. Apparatus according to cliam 7, wherein the primary screen is the face of a cathode ray tube and the conductor grid is located within the tube and behind the screen, the beam of the tube constituting said short-circuiting means.

16. Apparatus according to claim 7, wherein said remotely located screen and coextensive grid comprise a transparent vessel containing the grid and filled with a rare gas capable of ionization, said grid conductors of the two groups crossing close to each other so that when an audio frequency of sufficient intensity is applied, a gas-discharge glow will be set up in the vessel in the vicinity of the crossing of two conductors.

References Cited in the file of this patent

UNITED STATES PATENTS

| | | |
|---|---|---|
| 1,072,152 | Ocampo | Sept. 2, 1913 |
| 1,753,961 | Zworykin | Apr. 8, 1930 |
| 1,808,137 | Hartley | June 2, 1931 |
| 2,170,167 | Tarbox | Aug. 22, 1939 |
| 2,522,291 | Marrison | Sept. 12, 1950 |